(12) United States Patent
Hui (10) Patent No.: US 6,421,140 B1
(45) Date of Patent: *Jul. 16, 2002

(54) COLOR SPACE CONVERSION WITH SIMPLIFIED INTERPOLATION

(75) Inventor: Jonathan Y. Hui, Fremont, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/569,797

(22) Filed: Dec. 8, 1995

(51) Int. Cl.$^7$ ............ G06F 15/00; G03F 3/08; H04N 1/46; G06K 9/32
(52) U.S. Cl. ............ 358/1.9; 358/525; 358/523; 382/300
(58) Field of Search ............ 358/525, 523, 358/524, 527, 530, 539, 428, 515, 518, 1.9, 1.1; 382/162, 164, 165, 276, 277, 300; H04N 1/46

(56) References Cited

U.S. PATENT DOCUMENTS

| | | | | |
|---|---|---|---|---|
| 4,275,413 A | | 6/1981 | Sakamoto et al. ............ 358/80 |
| 4,334,240 A | | 6/1982 | Franklin ............ 358/78 |
| 4,477,833 A | * | 10/1984 | Clark et al. ............ 358/525 |
| 4,992,861 A | * | 2/1991 | D'Errico ............ 358/524 |
| 5,208,911 A | * | 5/1993 | Newman et al. ............ 395/162 |
| 5,241,373 A | | 8/1993 | Kanamori ............ 358/27 |
| 5,305,119 A | * | 4/1994 | Rolleston et al. ............ 358/522 |
| 5,331,439 A | * | 7/1994 | Bachar ............ 358/525 |
| 5,420,979 A | * | 5/1995 | Madden et al. ............ 395/162 |
| 5,428,465 A | * | 6/1995 | Kanamori et al. ............ 358/518 |
| 5,471,324 A | * | 11/1995 | Rolleston ............ 358/525 |
| 5,481,655 A | * | 1/1996 | Jacobs ............ 395/109 |
| 5,500,921 A | * | 3/1996 | Ruetz ............ 395/109 |
| 5,539,540 A | * | 7/1996 | Spaulding ............ 358/518 |
| 5,557,712 A | * | 9/1996 | Guay ............ 395/130 |
| 5,568,596 A | * | 10/1996 | Cawley ............ 395/131 |
| 5,592,591 A | * | 1/1997 | Rolleston ............ 395/105 |
| 5,594,557 A | * | 1/1997 | Rolleston ............ 358/518 |
| 5,596,510 A | * | 1/1997 | Boenke ............ 358/525 |
| 5,600,764 A | * | 2/1997 | Kakutani ............ 395/131 |
| 5,610,732 A | * | 3/1997 | Komatsu ............ 358/525 |
| 5,684,981 A | * | 11/1997 | Jones ............ 395/516 |
| 5,692,071 A | * | 11/1997 | Govaert ............ 382/167 |
| 5,862,253 A | * | 1/1999 | Schuneman et al. ............ 382/162 |

FOREIGN PATENT DOCUMENTS

WO   9408274   4/1994

OTHER PUBLICATIONS

J.M. Kasson, et al., "A tetrahedral interpolation technique for color space conversion", Computer Science, Jan. 12, 1993.

J.M. Kasson, et al., "A tetrahedral interpolation technique for color space conversion", SPIE Proceedings, vol. 1909, Feb. 1–3, 1993, pp. 127–138.

H. Motomura, et al., "CIELAB to CMYK Color Conversion by Prism and Slant Prism Interpolation Method", IS&T and SID's 2nd Color Imaging Conference: Color Science, Systems and Applications, 1994, pp. 156–158.

* cited by examiner

Primary Examiner—Madeleine Nguyen
(74) Attorney, Agent, or Firm—Fitzpatrick Cella Harper & Scinto (57) ABSTRACT

A method for converting color coordinate values of a target color from a first three-dimensional color space to a second three-dimensional color space, includes looking up the target color in a look-up table and interpolating each color component of the target color only in a single dimension between adjacent grid points in the look-up table. Preferably, each color component value shares a common grid point upon which interpolation is based for all color component values, with the common grid point lying on the neutral gray axis when a cube enclosing the target color includes the neutral gray axis of the first three-dimensional color space.

62 Claims, 8 Drawing Sheets

COLOR SPACE CONVERSION WITH SIMPLIFIED INTERPOLATION

BACKGROUND OF THE INVENTION

1. Field of the Invention

The present invention relates to techniques for color space conversion in which each color component of a color in three-dimensional color space is interpolated only in a single dimension.

2. Description of the Related Art

Color space conversion, that is, conversion of color coordinate values in a first three-dimensional color space to corresponding color coordinate values in a second three-dimensional color space, is a necessary part of today's computerized color image processing. Perhaps the most common example of color space conversion is a conversion from RGB color space to CMY color space so that an image which is displayed on a computer monitor (which requires color values for each of red, green and blue intensities) can be printed on a color printer (which requires values for each of cyan, magenta and yellow ink intensities). Other examples of color space conversion include conversions from CIELAB color space to RGB or CMY color space, and vice-versa.

Figure 1:
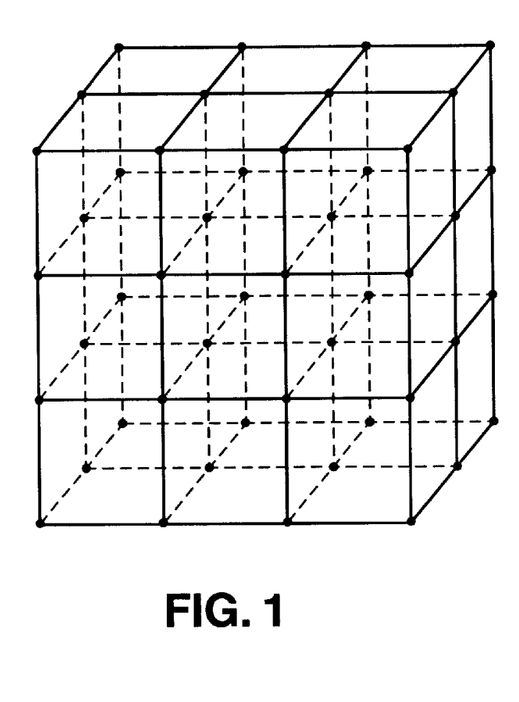
FIG. 1 is a conceptual view of a color look-up table having a regularly-arranged grid structure.
Figure 2:
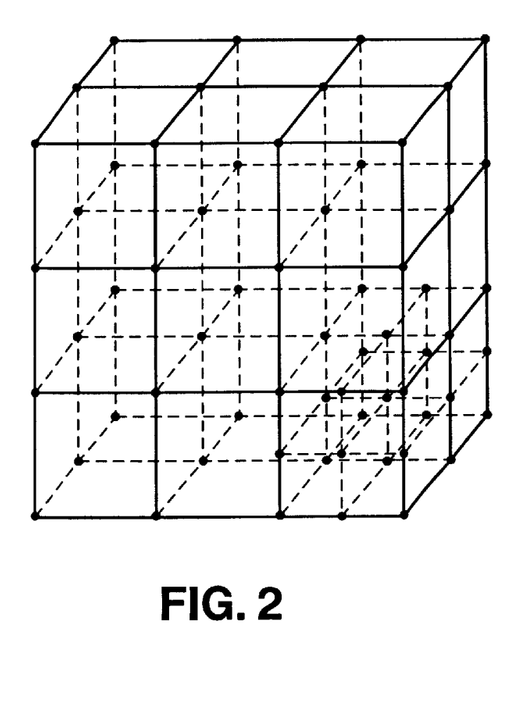
FIG. 2 is a conceptual view of a color look-up table having a non-regularly arranged grid structure.

One popular technique for color space conversion involves a look-up table combined with interpolation for color values not identically found in the look-up table. More specifically, to populate a look-up table, input color space is divided into cubes which may be the same size as illustrated in FIG. 1 or different sizes as illustrated in FIG. 2. The look-up table is populated with color coordinate values by measurement and/or calculation for each grid point (i.e., the corner of each cube). The output of any input color is found by interpolating among the eight grid points which form the corners of a cube containing the input color. Tri-linear interpolation and tetrahedral interpolation, as described in U.S. Pat. No. 4,477,833 (Clark, et al.) and U.S. Pat. No. 4,275,413 (Sakamoto, et al.), are widely-used interpolation techniques.

Although interpolation techniques currently used for color space conversion provide highly accurate results, even when the look-up table is only populated sparsely, the calculations needed to perform such interpolations are complex and time-consuming. Accordingly, a need exists for color conversion techniques which utilize simplified interpolation so as to decrease the time required for each color conversion.

SUMMARY OF THE INVENTION

It is therefore an object of the present invention to address the foregoing need by providing a color space conversion technique with simplified interpolation in which each color component of a color in three-dimensional color space is interpolated only in a single dimension. Particularly with a color look-up table which is generously populated, such as with 16 or 33 gradations on each color coordinate axis, the inventor herein has discovered that interpolation in only a single dimension yields much the same visual results as more complex tri-linear or tetrahedral interpolation, provided that the proper grid points are selected for single dimension interpolation.

Thus, in one aspect of the invention, for a target color whose color coordinate values are given in a first three-dimensional color space, corresponding color coordinate values in a second three-dimensional color space are obtained by reference to a look-up table by which color coordinate values in the first three-dimensional color space may be converted to color coordinate values in the second three-dimensional color space. The look-up table includes plural grid-arranged points corresponding to respectively different colors in the first three-dimensional color space, and provides color coordinate values for the colors in the second three-dimensional color space. One common grid point is selected from the look-up table, the common grid point being selected based on proximity to the target color such that the common grid point is one of the eight grid points that define corners of a cube which encloses the target color. Preferably, the common grid point always lies at the corner of the enclosing cube that has the same relative orientation to the target color, no matter where in the look-up table the target color and the enclosing cube are positioned, and the common grid point also preferably lies on the neutral gray axis when the enclosing cube includes the neutral gray axis of the look-up table. A first grid point adjacent to the common grid point is selected in a direction related to the first color coordinate, and one-dimensional interpolation is performed between the common grid point and the first grid point based on the input color coordinate value so as to obtain a first color coordinate value for the target color of the second three-dimensional color space. For example, in one representative embodiment, if conversion is desired from RGB color space to CMY color space, to obtain a cyan coordinate value of the target color, the first grid point is selected in a direction that varies in red only, since changes in red value are most related to changes in cyan value. The same procedure is applied for selecting second and third grid points adjacent to the common grid point in directions related to the second and third color coordinates, respectively, whereafter interpolation in one dimension is performed between the common grid point and the first and second grid points based on the inputted color coordinate values so as to obtain second and third color coordinate values for the target color in the second three-dimensional color space.

By virtue of the foregoing arrangement, because each color component in three-dimensional color space is interpolated only in a single dimension, rapid interpolation can be performed yielding converted color coordinate values more quickly than in conventional techniques. Moreover, since the direction of one-dimension interpolation is selected differently for each color component value and in relation to the color coordinate itself, the difference between colors converted according to the present invention and those converted according to more accurate conventional interpolation techniques is minimal, and nearly imperceptible for generously-populated color look-up table such as those with 16 or 33 grid intervals.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

The present invention will explained using a representative embodiment of a print driver which converts from RGB color coordinate space to CMY color coordinate space so as to permit color printout of images displayed on a color monitor. It is to be understood, however, that the invention is not limited to the representative embodiment described herein, but rather can be applied in suitable circumstances wherever color coordinate conversion is desired.

Figure 3:
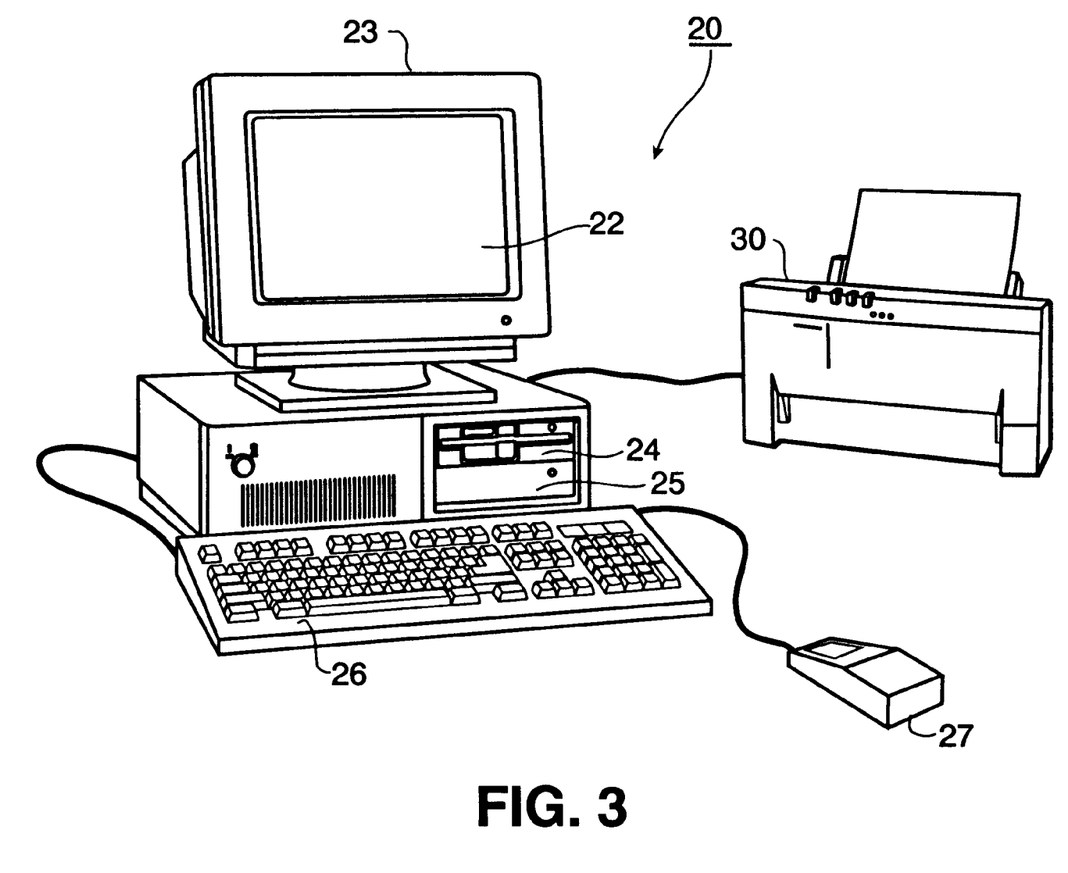
FIG. 3 is a perspective view of a personal computing system having a print driver to which the present invention is applied.

FIG. 3 is a view showing the outward appearance of representative computing equipment which incorporates a printer driver according to the invention. Shown in FIG. 3 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, and a pointing device 27 such as a mouse or the like which is also provided to permit manipulation of objects on display screen 22. A conventional color printer 30, such as a color bubble jet printer, is also provided.

While a bubble jet printer is presently preferred, any color printer which forms full color images by mixing cyan, magenta and yellow color primaries in amounts set by corresponding color component values, such as a color laser beam printer or the like, is suitable in the practice of the invention.

In accordance with operator instructions, and under control of the windowing operating system, stored application programs such as graphics application programs, drawing application programs, desktop publishing application programs and the like, are selectively activated to process and to manipulate data. Also in accordance with operator instructions, and based on those stored application programs, commands are issued to display images on monitor 23 and also to print images appearing on monitor 23, and those images are then printed on printer 30 as described more fully hereinbelow.

Figure 4:
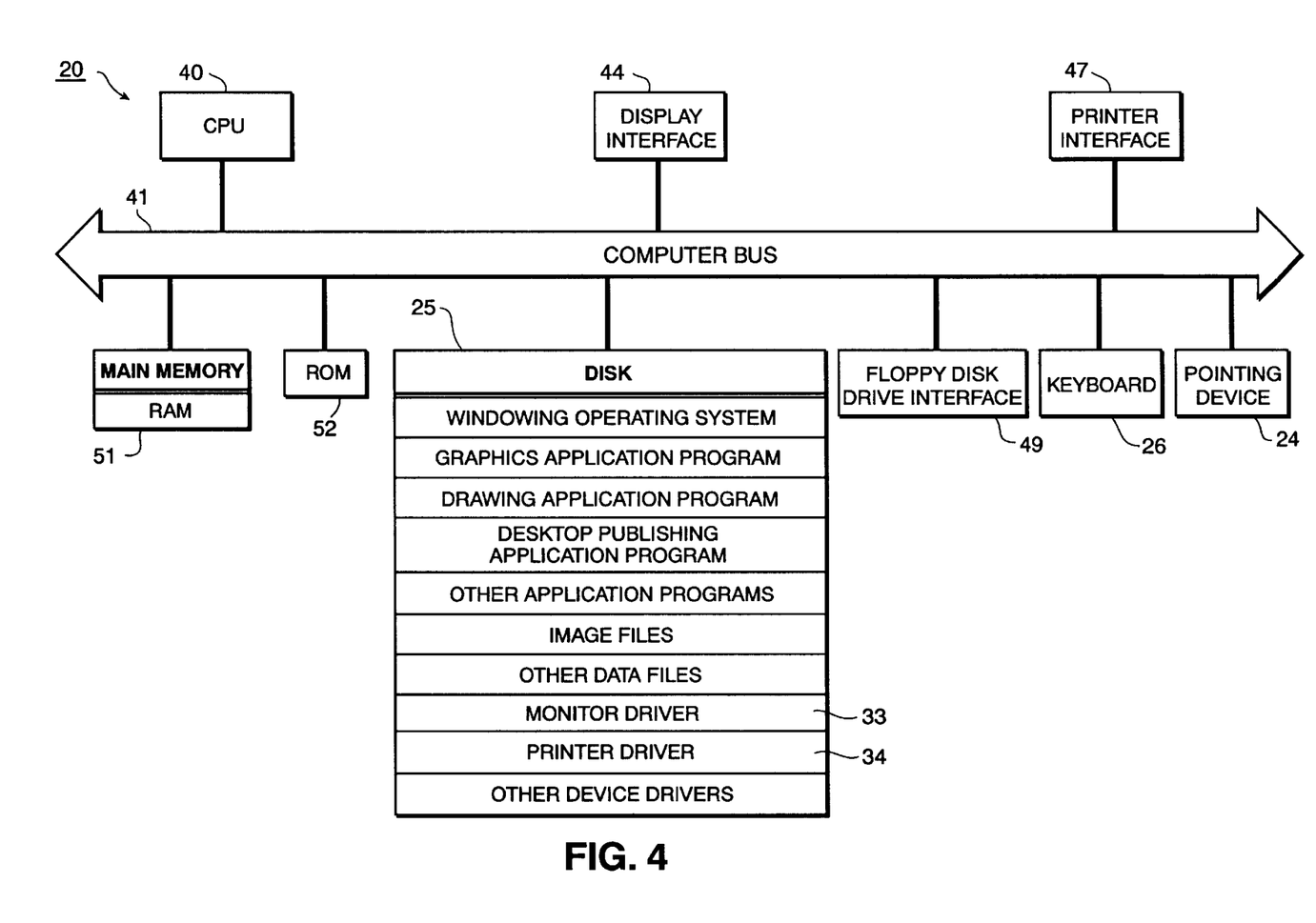
FIG. 4 is a block diagram view of the FIG. 2 apparatus.

FIG. 4 is a detailed block diagram showing the internal construction of computing equipment 20. As shown in FIG. 4, computing equipment 20 includes a central processing unit (CPU) 40 such as programmable microprocessor interfaced to a computer bus 41. Also interfaced to computer bus 41 is display interface 44, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via an unshown network) into main memory 51 and executes those stored program instruction sequences out of main memory 51.

ROM (read only memory) 52 is provided for storing invariant instruction sequences such as start-up instruction sequences or basic input/output operating system (BIOS) sequences for operation of keyboard 26.

As shown in FIG. 4, and as previously mentioned, fixed disk 25 stores program instruction sequences for the windowing operating system and for various application programs such as a graphics application program, a drawing application program, a desktop publishing application program, and the like. In addition, stored on fixed disk 25 are image files such as are displayed on monitor 23 or printed on printer 30 under control of a designated application program. Fixed disk 25 also stores a monitor driver which controls how RGB color primary values are provided to display interface 44, and printer driver 34 which controls how CMY color component values are provided to printer interface 47 for printout by printer 30. Other device drivers are also stored on fixed disk 25, for providing appropriate signals to various other devices connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media on which a copy of printer driver 34 is stored. The user would then install printer driver 34 onto disk 25 by inserting the purchased floppy disk into floppy disk drive 24 and by commanding CPU 40 to copy printer driver 34 from the floppy disk onto disk 25. It is also possible for the user, via an unshown modem interface, to download printer driver 34 from a computerized bulletin board to which the drivers had previously been uploaded.

Figure 5:
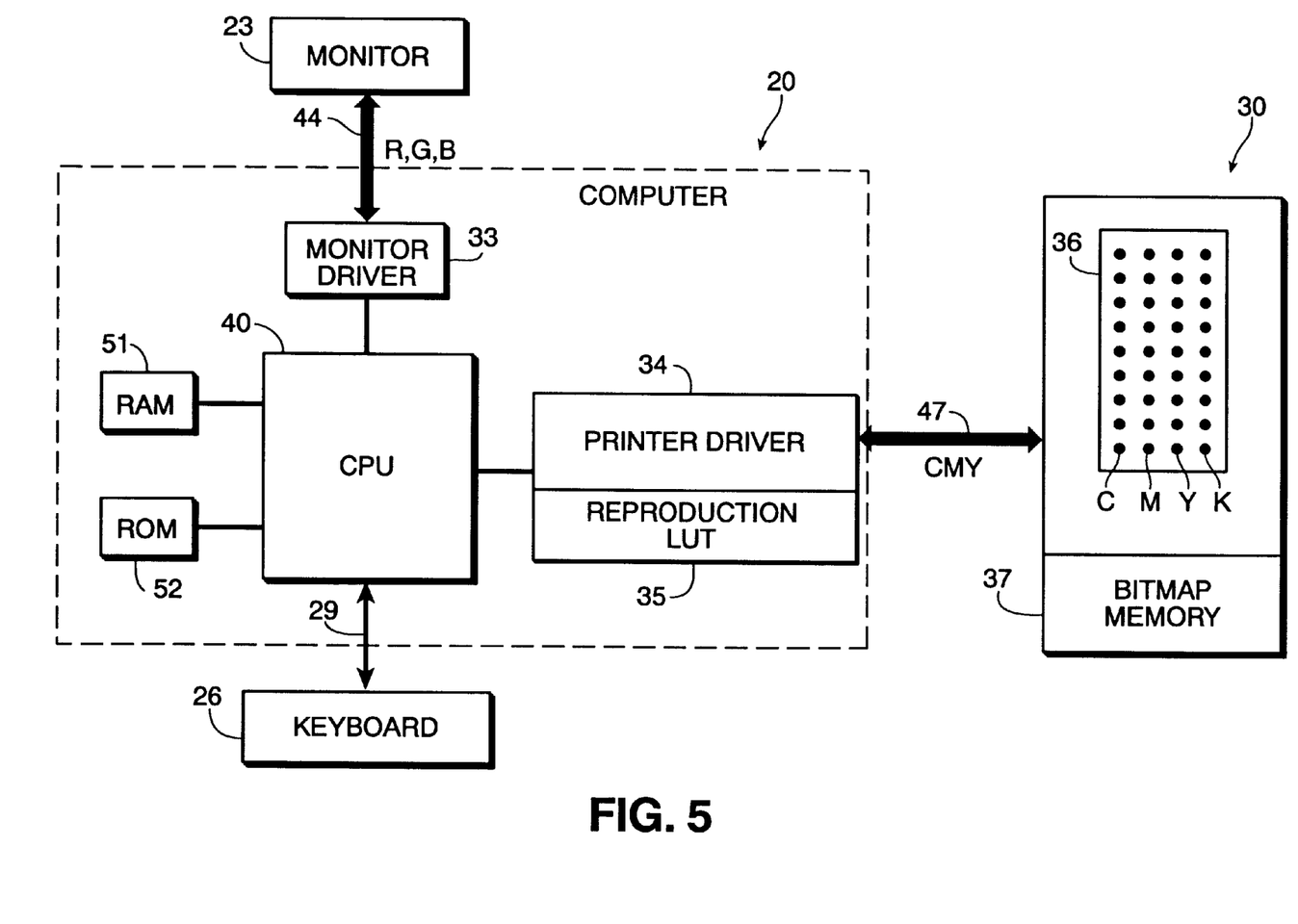
FIG. 5 is a functional block diagram which stresses functional connectivity of the FIG. 4 block diagram.

FIG. 5 is a functional block diagram showing how computer 20 interacts with monitor 23 and printer 30. Shown in FIG. 5 are computer 20 with monitor driver 33, printer driver 34, CPU 40, RAM 51 and ROM 52, all arranged functionally rather than in the structural arrangement shown in FIG. 4.

As mentioned above, using keyboard 26, an operator can cause CPU 40 to execute stored program instructions which cause color images to be displayed on monitor 23 and which cause corresponding color images to be printed on color printer 30. Specifically, and in cooperation with the stored program instructions in the application program stored on disk 25, CPU 40 derives a color image for display on monitor 23. CPU 40 provides the color image to monitor driver 33 which in turn derives RGB values for each pixel in the monitor 23. The RGB values are provided via display interface 44 to monitor 23 where those values are displayed.

Upon request, CPU 40 also feeds a color image to printer driver 34 for printing by color printer 30. Printer driver 34 derives CMY values for each pixel of the color image based on the color values provided from CPU 40. The CMY values are determined in accordance with the present invention from RGB values in accordance with interpolation of a reproduction look-up table (LUT) 35.

Printer driver 34 feeds the CMY values via printer interface 46 to printer 30 where they are stored in bitmap memory 37 within printer 30. The CMY values may be altered by printer 30 so as to provide a black (hereinafter "K" value) in accordance with standard under color removal ("UCR") or gray component replacement ("GCR") techniques. Alternatively, it is possible for printer driver 34 to provide an appropriate K value.

In any event, bitmap memory 37 may store a full bitmap image of the printed image, or it may store only a band or partial bitmap image. When sufficient color data, namely CMYK data, is stored in bitmap memory 37, a color print head 36 reciprocates across a platen adjacent a sheet of paper. In the presently preferred embodiment, print head 36 includes 32 ink jet nozzles arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bitmap memory 37 such that in one reciprocation of print head 36 across the platen, eight rows of pixels are printed.

Figure 6:
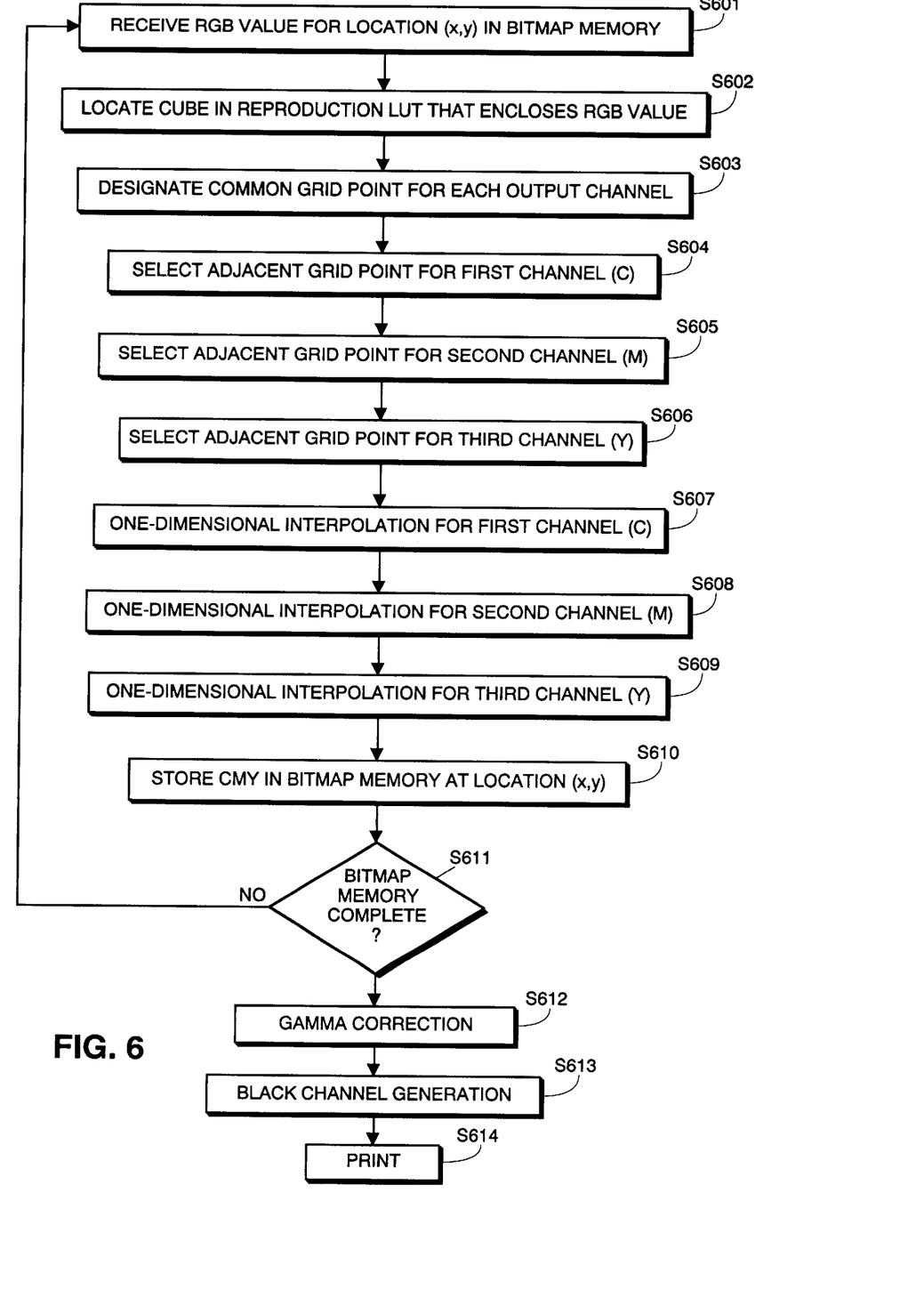
FIG. 6 is a flow diagram used to explain conversion from one color coordinate space to another.

FIG. 6 is a flow diagram showing the process steps executed by printer driver 35 so as to select CMY values from the RGB color data provided by CPU 40. Generally speaking, according to the process steps shown in FIG. 6, to convert color coordinate values of a target color given in RGB color space, a cube in reproduction LUT 35 that encloses the given RGB value is first located, and from the cube a common grid point is designated for each of the C, M and Y output channels. Thereafter, a first adjacent grid point is selected for the cyan channel, and one-dimensional interpolation is performed between the common grid point and the first grid point, based on the inputted RGB value, so as to obtain a cyan value for the target color. Likewise, for each of the magenta and yellow channels, adjacent grid points are selected and one-dimensional interpolation is performed between the common grid point and the selected adjacent grid point based on the inputted RGB value so as to obtain magenta and yellow channel values, respectively. Thereafter, the interpolated CMY values are stored for printing by printer 30.

In more detail, in step S601, printer driver 34 receives RGB values for a location (x, y) in bit map memory 37. In step S602, printer driver 34 locates a cube in reproduction LUT 35 that encloses the inputted RGB value. Flow then advances to step S603 in which one of the eight corners of the cube located in step S603 is designated as a common grid point for each output channel. This operation is shown in connection with FIGS. 7 and 8.

Figure 7:
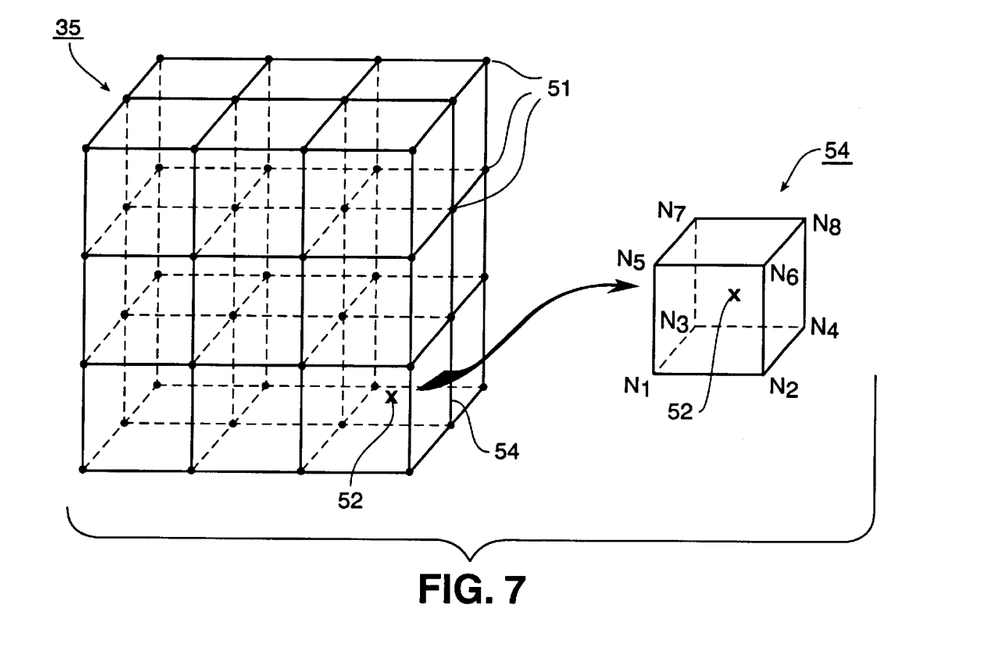
FIGS. 7 through 12 are views for explaining selection of grid points for one-dimensional interpolation.

Thus, FIG. 7 shows reproduction LUT 35 as plural grid-arranged points 51 corresponding to respectively different colors in RGB 3-dimensional color space. For each grid point 51 in reproduction LUT 35, color coordinate values are provided for the colors in CMY space. In accordance with step S601, an RGB color such as color 52 is received and cube 54 is located in reproduction LUT since cube 54 encloses RGB value 52. Cube 54 is shown in enlarged detail in the inset for FIG. 7, from which it can be seen that cube 54 is defined by eight rectangularly-arranged grid points $N_1$ through $N_8$.

Figure 8:
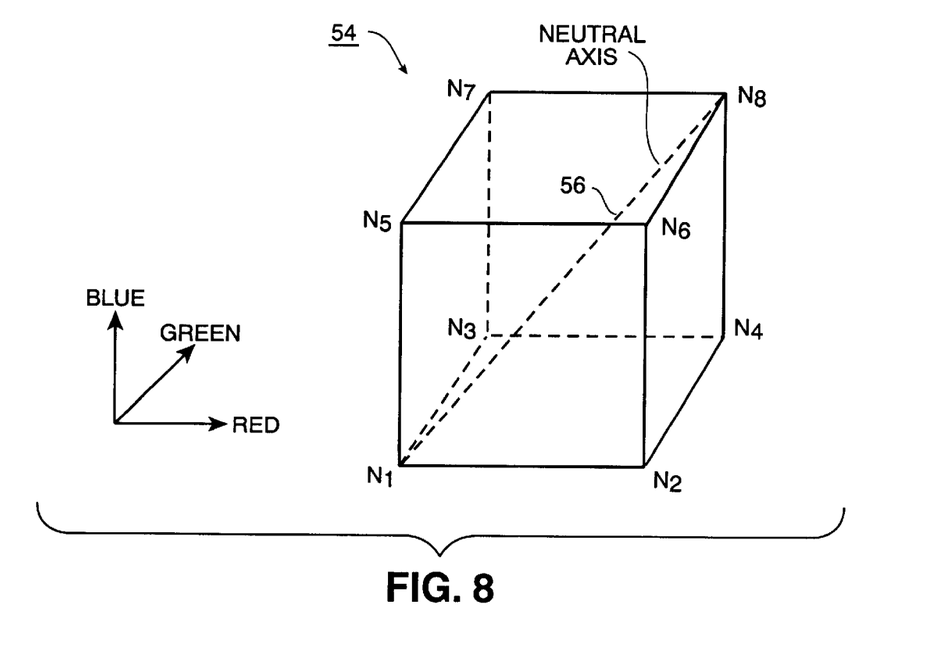

FIG. 8 shows cube 54 with each of the red, green and blue axes 55 specifically identified. As shown in FIG. 8, cube 54 includes neutral axis 56 which is an axis along which all gray colors lie. In accordance with step S603, a common grid point is selected from cube 54. Preferably, when cube 54 includes the neutral gray axis, the common grid point lies along the neutral axis, since selecting a common grid point along the neutral axis will lead to better gray-scale reproduction than if the common grid point were not selected to lie on the neutral axis. Thus, as shown in FIG. 8, the common grid point designated in step S603 should be either grid point $N_1$ or grid point $N_8$.

In addition, the common grid point is preferably selected consistently from cube to cube, even if the cube does not include the neutral gray axis, so that relative to the target color, the same corner of the enclosing cube is always selected as the common grid point no matter where in the look-up table the target color and the enclosing cube is positioned. Thus, if $N_1$ is selected as the common grid point for cubes which include the neutral gray axis, then $N_1$ is preferably selected for all cubes, wherever they lie in the look-up table. Likewise, if $N_8$ is selected as the common grid point for cubes which include the neutral gray axis, then $N_8$ is preferably selected for all cubes, wherever they lie in the look-up table.

Reverting to FIG. 6, step S604 selects a grid point adjacent the common grid point for use in connection with obtaining the first coordinate value in the second three-dimensional color space, namely the C value in CMY color space. Preferably, the adjacent grid point is selected in a direction related to the first color coordinate. For example, a very primitive approach for converting RGB values to CMY values is to employ the following three equations:

$$R=1-C$$

$$G=1-M$$

$$B=1-Y$$

Figure 9:
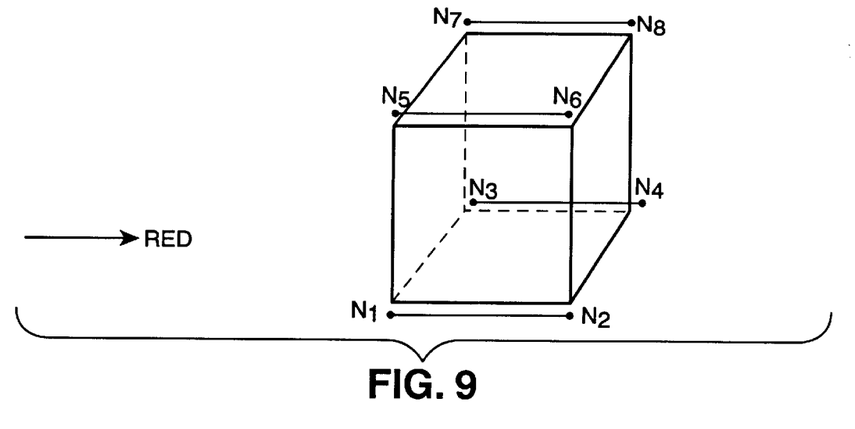

The above equations are far too coarse to yield any good color reproductions, but indicate that red values are directly related to cyan values, that green values are directly related to magenta values, and that blue values are directly related to yellow values. Accordingly, as shown in FIG. 9, when selecting an adjacent grid point for the cyan channel as set forth in step S604, grid points should be selected in directions for which only the red value varies. Thus, referring to FIG. 9, if point $N_1$ is the common grid point designated in step S603, $N_2$ is an appropriate adjacent grid point for the cyan channel. (Conversely, if $N_2$ is the common grid point then $N_1$ is the appropriate adjacent grid point.) Other suitable common grid point/adjacent grid point pairs are $N_3$ and $N_4$, $N_8$ and $N_6$, and $N_7$ and $N_8$. If the common grid point is selected as $N_1$ or $N_8$, then appropriate grid points for interpolation to obtain cyan color coordinates are $N_1$ and $N_2$ or $N_7$ and $N_8$, respectively.

Figure 10:
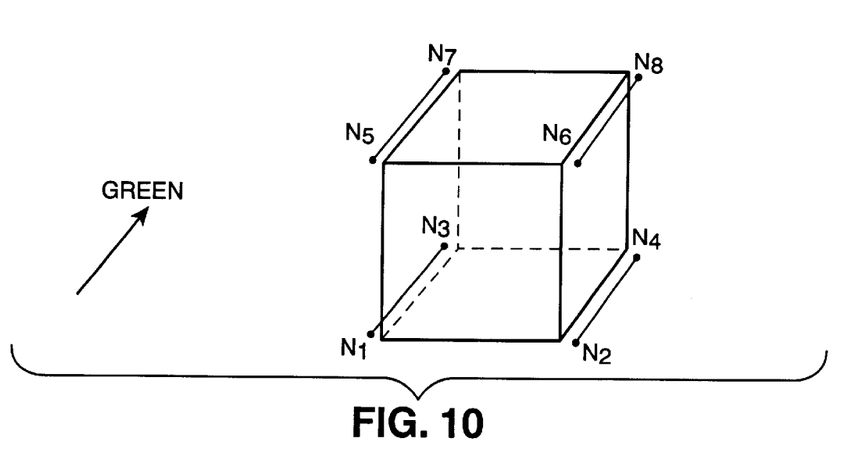
Figure 11:
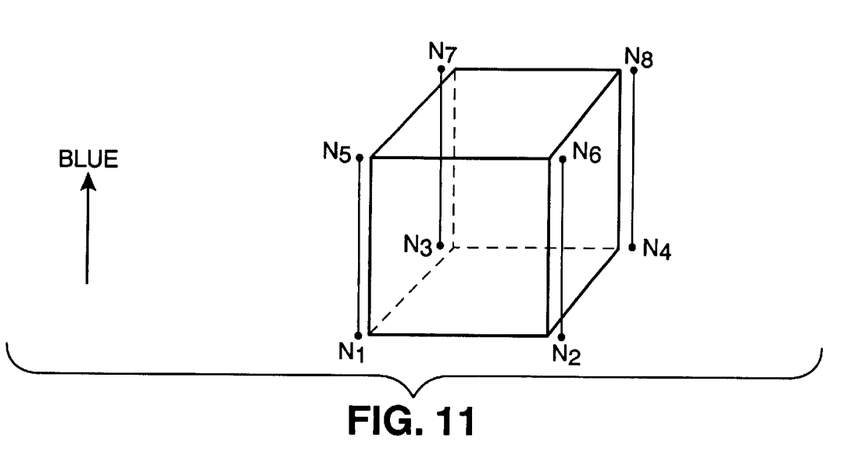

Reverting to FIG. 6, in steps S605 and S606, corresponding adjacent grid points are selected for each of the second (magenta) and third (yellow) output channels. Again, the adjacent grid is selected so that it is in a direction related to the respective color components. This is illustrated in FIGS. 10 and 11, and in conjunction with the above equations, which show color dependence of magenta output on the green coordinate and color dependence of yellow output on the blue coordinate. Thus, as shown in FIG. 10, for the magenta channel, adjacent grid points are selected that vary in the green coordinate only, yielding grid point pairs of $N_1$ and $N_3$, $N_2$ and $N_4$, $N_8$ and $N_7$, and $N_6$ and $N_8$. If as is preferred, the common grid point is selected as $N_1$ or $N_8$, then the most preferred grid point pairs for use in interpolation are $N_1$ and $N_3$ or $N_6$ and $N_8$, respectively.

Likewise, as shown in FIG. 11, for the yellow output channel, adjacent grid points are selected in directions that vary in the blue coordinate only. Thus, as seen from FIG. 11, appropriate grid point pairs for one-dimensional interpolation are $N_1$ and $N_8$, $N_2$ and $N_6$, $N_3$ and $N_7$, and $N_4$ and $N_8$. Again, if the common grid point is selected as $N_1$ or $N_8$, then the most preferred grid point pairs for one-dimensional interpolation to obtain yellow output are $N_1$ and $N_5$, and $N_4$ and $N_8$, respectively.

In steps S607, S608 and S609, one-dimensional interpolation is performed for each of the three color components of the three-dimensional color input in the RGB coordinate space. Since interpolations are one-dimensional, bi-linear interpolation is preferred. In the present example, assuming that $N_1$ is chosen as the common grid point, then bi-linear interpolation in one dimension is performed using points $N_1$ and $N_2$ for cyan output, points $N_1$ and $N_3$ for magenta output, and points $N_1$ and $N_5$ for yellow output, as follows:

$$Cyan(r, g, b) = \frac{(r - R_1) * Cyan(N_2) + (R_2 - r) * Cyan(N_1)}{(R_2 - R_1)}$$

$$Magenta(r, g, b) = \frac{(g - G_1) * Magenta(N_3) + (G_3 - g) * Magenta(N_1)}{(G_3 - G_1)}$$

$$Yellow(r, g, b) = \frac{(b - B_1) * Yellow(N_5) + (B_5 - b) * Yellow(N_1)}{(B_5 - B_1)}$$

where Cyan, Magenta and Yellow outputs are cyan, magenta and yellow outputs for a corresponding color rgb in RGB space, where $R_1$ and $R_2$ are the red coordinates for points $N_1$ and $N_2$, respectively, $G_1$ and $G_3$ are the green coordinates for points $N_1$ and $N_3$, respectively, $B_1$ and $B_5$ are blue coordinates for points $N_1$ and $N_5$, respectively, and where Cyan ($N_2$) and Cyan($N_1$) are cyan values from the look-up table at points $N_2$ and $N_1$, respectively, Magenta($N_3$) and Magenta ($N_1$) are magenta values from the look-up table at points $N_3$ and $N_1$, respectively, Yellow($N_5$) and Yellow($N_1$) are yellow values from the look-up table at points $N_5$ and $N_1$, respectively.

Figure 12:
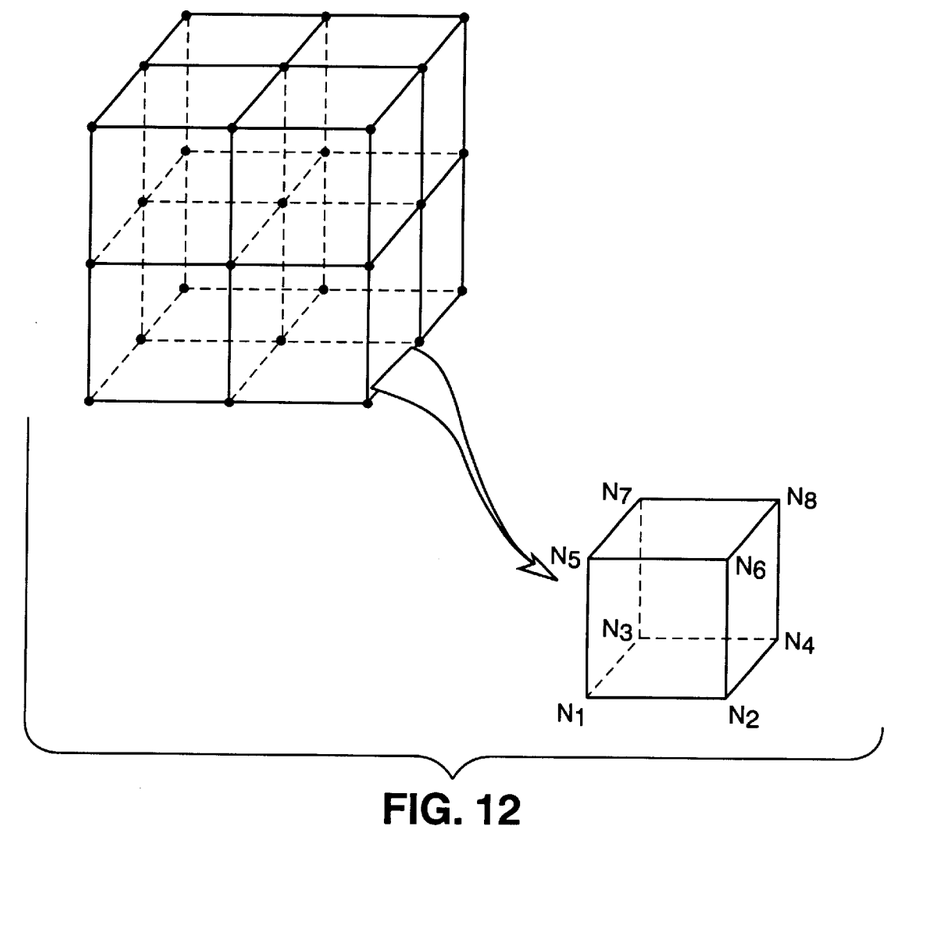

As a simple but concrete example of steps S602 through S610, assume that data point (r=192, g=64, b=64) in RGB space is to be converted to CMY space using the simplified look-up table illustrated in FIG. 12 in which there are three grid points, namely 0, 128 and 256, along each of the R, G and B coordinates.

Now this RGB color is located in the cube in the lower right front corner of FIG. 12. The eight neighboring grid points defining the cube are:

$N_1$=(128,0,0), $N_2$=(256,0,0), $N_3$=(128,128,0),
$N_4$=(256,128,0), $N_5$=(128,0,128), $N_6$=(256,0,128),
$N_7$=(128,128,128), and $N_8$=(256,128,128).

For consistency among all the cubes in the look-up table, $N_1$ is selected as the common grid point because in cubes which contain the neutral gray axis, $N_1$ lies on the neutral gray axis. Adjacent points are selected for each output channel (cyan, magenta and yellow) in appropriate related directions, as follows: for cyan, pick $N_1$ and $N_2$, for magenta, pick $N_1$ and $N_3$, and for Yellow, pick $N_1$ and $N_5$. Using the bi-linear interpolation function as above, the result becomes:

$$C(192, 64, 64) = \frac{(192 - 128) * C(256, 0, 0) + (256 - 192) * C(128, 0, 0)}{(256 - 128)}$$

$$M(192, 64, 64) = \frac{(64 - 0) * M(128, 128, 0) + (128 - 64) * M(128, 0, 0)}{(128 - 0)}$$

$$Y(192, 64, 64) = \frac{(64 - 0) * Y(128, 0, 128) + (128 - 64) * Y(128, 0, 0)}{(128 - 0)}$$

Flow in FIG. 6 then advances to step S610 in which the CMY values obtained by the above-described interpolation are stored in bit map memory 37 at location (x, y). If desired, the CMY values may be modified before storage, for example, by appropriate UCR or GCR techniques so as to obtain a K value.

In step S611, printer driver determines whether the bitmap memory has been completed, or if a needed part or band of bitmap memory 37 has been completed. If the bitmap memory has not been completed, then flow returns to step S601 in which the next RGB value is received from the next location (x, y) in bitmap memory. On the other hand, if the bitmap memory has been completed, or if a sufficient area of the bitmap memory has been completed (such as an eight row long band corresponding to the eight rows of ink jet nozzles in head 36), then flow advances to step. S612 where gamma correction is performed. Gamma correction corrects the CMY values in bitmap memory so as to achieve a uniform distribution of luminance. Gamma correction may be carried out either by printers driver 34 or by printer 30, or by a combination thereof, as appropriate. In step S613, UCR or GCR is performed, if not already performed, so as to derive a black value for location (x, y) in bitmap memory. UCR in the present embodiment may be performed by the simple expedient of selecting the minimum value of CMY and assigning that value to the black value, and thereafter adjusting each of the CMY values by subtracting the assigned black value.

The order of steps S612 and S613 is not critical, and those steps may be switched, for example, to accommodate a particular color printing technique such as continuous tone, dither or error diffusion.

In step S614, color printing is initiated using the CMYK values stored in bitmap memory 37.

Thus, the present invention provides for coordinate space conversion in which each color component of a color in three-dimensional color space is interpolated only in a single dimension so as to obtain color component values for the same color in a different color coordinate space. In the embodiment described above, color coordinate conversion is effectuated from RGB to CMY space, but as mentioned previously, the present invention can easily be applied to color coordinate conversions to and from different color spaces, such as from CIELAB to RGB or CMY color spaces. Accordingly, it is to be understood that the invention is not limited to the above-described embodiment, and that various changes and modifications may be made by those of ordinary skill in the art without departing from the spirit and scope of the appended claims.

What is claimed is:

1. A method for processing color imaging data using at least one computer system and generating values for second color data for each of second color components from first color data representing a target color said method comprising:

looking up the target color in a look-up table which provides, at plural discrete grid points in the first three-dimensional color space, color component values in the second color space; and interpolating, for each color component of the second color components, between a common grid point and an adjacent grid point in the look-up table, wherein said adjacent grid point differs based on a respective kind of each component of the second color components.

2. A method according to claim 1, further comprising the step of selecting the common grid point for interpolating each color component.

3. A method according to claim 2, wherein the common grid point is in the same general direction relative to the target color no matter where in the look-up table the target color is positioned.

4. A method according to claim 3, wherein the common grid point lies along the neutral gray axis when a cube enclosing the target color includes the neutral gray axis of the first three-dimensional color space.

5. A method according to claim 1, wherein the look-up table includes at least 16 grid points in each dimension of the first three-dimensional color space.

6. A method for converting color coordinate values of a target color from a first three-dimensional color space to a second three-dimensional color space defined by first, second and third color coordinates through use of a color look-up table which provides, at each of plural grid-arranged points in the first three-dimensional space, color component values in the second three-dimensional color space, comprising the steps of:

selecting one common grid point from the color look-up table, the one common grid point being in proximity to the target color;

selecting a first grid point adjacent to the common grid point in a direction related to the first color coordinate, and interpolating in one dimension between only the common grid point and the first grid point based on a color coordinate value of the target color in the first three-dimensional color space so as to obtain a first color coordinate value for the target color in the second three-dimensional color space;

selecting a second grid point adjacent to the common grid point in a direction related to the second color coordinate, and interpolating in one dimension between only the common grid point and the second grid point based on the color coordinate values of the target color so as to obtain a second color coordinate value for the target color in the second three-dimensional color space;

selecting a third grid point adjacent to the common grid point in a direction related to the third color coordinate, and interpolating in one dimension between only the common grid point and the third grid point based on the color coordinate values of the target color so as to obtain a third color coordinate value for the target color in the second three-dimensional color space; and outputting the first, second and third color coordinate values of the target color in the second three-dimensional color space.

7. A method according to claim 6, wherein the common grid point is in the same general direction relative to the target color no matter where in the look-up table the target color is positioned.

8. A method according to claim 7, wherein the common grid point lies along the neutral gray axis when a cube enclosing the target color includes the neutral gray axis of the first three-dimensional color space.

9. A method according to claim 6, wherein the look-up table includes at least 16 grid points in each dimension of the first three-dimensional color space.

10. An apparatus for converting color coordinate values of a target color from a first three-dimensional color space to a second three-dimensional color space defined by first, second and third color coordinates, comprising:

input means for inputting color coordinate values of the target color in the first three-dimensional space;

a memory for storing executable process steps, and for storing a color look-up table by which color coordinate values of colors in the first three-dimensional color space may be converted to color coordinate values for corresponding colors in the second three-dimensional color space, the color look-up table providing, at plural grid-arranged points in the first three-dimensional color space, color component values in the second three-dimensional color space; and a processor for executing the process steps stored in said memory so as to (1) select one common grid point from the color look-up table, the one common grid point being in proximity to the target color, (2) select a first grid point adjacent to the common grid point in a direction related to the first color coordinate, and interpolating in one dimension between only the common grid point and the first grid point based on a color coordinate value of the target color in the first three-dimensional color space so as to obtain a first color coordinate value for the target color in the second three-dimensional color space, (3) select a second grid point adjacent to the common grid point in a direction related to the second color coordinate, and interpolating in one dimension between only the common grid point and the second grid point based on the color coordinate values of the target color so as to obtain a second color coordinate value for the target color in the second three-dimensional color space, (4) select a third grid point adjacent to the common grid point in a direction related to the third color coordinate, and interpolating in one dimension between only the common grid point and the third grid point based on the color coordinate values of the target color so as to obtain a third color coordinate value for the target color in the second three-dimensional color space; and output means for outputting the first, second and third color coordinate values of the target color in the second three-dimensional color space.

11. An apparatus according to claim 10, wherein the common grid point is in the same general direction relative to the target color no matter where in the look-up table the target color is positioned.

12. An apparatus according to claim 11, wherein the common grid point lies along the neutral gray axis when a cube enclosing the target color includes the neutral gray axis of the first three-dimensional color space.

13. An apparatus according to claim 10, wherein the look-up table includes at least 16 grid points in each dimension of the first three-dimensional color space.

14. Computer-executable process steps stored on a computer readable medium for generating values for second color data for each of second color components from first color data representing a target color, said computer-executable process steps comprising:

a look-up step to look up the target color in a look-up table which provides, at plural discrete grid points in the first three-dimensional color space, color component values in the second color space; and an interpolation step to interpolate, for each color component of the second color components, between a common grid point and an adjacent grid point in the look-up table, wherein said adjacent grid point differs based on a respective kind of each component of the second color components.

15. Computer-executable process steps according to claim 14, further comprising a selection step to select the common grid point for interpolating each color component.

16. Computer-executable process steps according to claim 15, wherein the common grid point is in the same general direction relative to the target color no matter where in the look-up table the target color is positioned.

17. Computer-executable process steps according to claim 16, wherein the common grid point lies along the neutral gray axis when a cube enclosing the target color includes the neutral gray axis of the first three-dimensional color space.

18. Computer-executable process steps according to claim 14, wherein the look-up table includes at least 16 grid points in each dimension of the first three-dimensional color space.

19. An apparatus for generating values for second color data for each of second color components from first color data representing a target color, comprising:

input means for inputting color coordinate values of the target color in the first three-dimensional space;

a memory for storing executable process steps, and for storing a look-up table which provides, at plural discrete grid points in the first three-dimensional space, color component values in the second color space; and     a processor for executing the process steps stored in said memory so as to (1) look up the target color in the look-up table, and (2) interpolate, for each color component of the second color components, between a common grid point and an adjacent grid point in the look up table, wherein said adjacent grid point differs based on a respective kind of each component of the second color components.

20. An apparatus according to claim 19, wherein the process steps further comprise a step to select the common grid point for interpolating each color component.

21. An apparatus according to claim 20, wherein the common grid point is in the same general direction relative to the target color no matter where in the look-up table the target color is positioned.

22. An apparatus according to claim 21, wherein the common grid point lies along the neutral gray axis when a cube enclosing the target color includes the neutral gray axis of the first three-dimensional color space.

23. An apparatus according to claim 19, wherein the look-up table includes at least 16 grid points in each dimension of the first three-dimensional color space.

24. Computer-executable process steps stored on a computer readable medium for converting color coordinate values of a target color from a first three-dimensional color space to a second three-dimensional color space defined by first, second and third color coordinates through use of a color look-up table which provides, at each of plural grid-arranged points in the first three-dimensional space, color component values in the second three-dimensional space, said computer-executable process steps comprising:

a common grid point selection step to select one common grid point from the color look-up table, the one common grid point being in proximity to the target color;

a first color coordinate value obtaining step to select a first grid point adjacent to the common grid point in a direction related to the first color coordinate, and to interpolate in one dimension between only the common grid point and the first grid point based on a color coordinate value of the target color in the first three-dimensional color space so as to obtain a first color coordinate value for the target color in the second three-dimensional color space;

a second color coordinate value obtaining step to select a second grid point adjacent to the common grid point in a direction related to the second color coordinate, and to interpolate in one dimension between only the common grid point and the second grid point based on the color coordinate values of the target color so as to obtain a second color coordinate value for the target color in the second three-dimensional color space;

a third color coordinate value obtaining step to select a third grid point adjacent to the common grid point in a direction related to the third color coordinate, and to interpolate in one dimension between only the common grid point and the third grid point based on the color coordinate values of the target color so as to obtain a third color coordinate value for the target color in the second three-dimensional color space; and     an output step to cause to be output the first, second and third color coordinate values of the target color in the second three-dimensional color space.

25. Computer-executable process steps according to claim 24, wherein the common grid point is in the same general direction relative to the target color no matter where in the look-up table the target color is positioned.

26. Computer-executable process steps according to claim 25, wherein the common grid point lies along the neutral gray axis when a cube enclosing the target color includes the neutral gray axis of the first three-dimensional color space.

27. Computer-executable process steps according to claim 24, wherein the look-up table includes at least 16 grid points in each dimension of the first three-dimensional color space.

28. A method for processing color imaging data using at least one computer system and generating values for second color data for each of plural second color components from first color data representing a target color, said method comprising:

selecting plural discrete grid points corresponding to each component of the second color components, based on a respective kind of each component of the second color components, and based on the first color data for the target color; and     for each component of the second color components, interpolating the corresponding plural grid points so as to obtain the second color data,     wherein a common grid point is used and at least one grid point selected for at least one of the second color components is different from the grid points selected for at least one other of the second color components.

29. A method according to claim 28, wherein the common grid point is common to each of the second color components.

30. A method according to claim 29, wherein the common grid point is in the same general direction to the target color no matter where the target color is located.

31. A method according to claim 29, wherein the common grid point lies along a neutral gray axis when a space formed by the grid points for all the second color components includes the neutral gray axis.

32. A method according to claim 28, wherein the plural discrete grid points are selected from a look-up table in which when a grid point corresponding to first color data for a particular target color is looked up, second color data corresponding to the particular color are obtained.

33. A method according to claim 28, wherein a grid includes all the grid points for all of the second color components, and wherein the grid includes one dimension for each color component of the first data.

34. A method according to claim 33, wherein each dimension of the grid includes at least 16 grid points.

35. A method according to claim 28, wherein for each component of the second color components interpolation is performed in only a single dimension.

36. A method according to claim 35, wherein the interpolation for each component of the second color components is performed in a different dimension.

37. A method according to claim 28, wherein the first color data has been obtained by performing undercolor removal.

38. A method according to claim 28, wherein in said selecting step, only a pair of grid points is selected for each component of the second color components, each pair of grid points for one component being different from pairs of grid points for all other components.

39. Computer-executable process steps stored on a computer readable medium to process color imaging data using at least one computer system and generate values for second color data for each of plural second color components from first color data representing a target color, said computer-executable process steps comprising:

a selection step to select plural discrete grid points corresponding to each component of the second color components, based on a respective kind of each component of the second color components, and based on the first color data for the target color; and an interpolation step to interpolate, for each component of the second color components, the corresponding plural grid points so as to obtain the second color data, wherein a common grid point is used and at least one grid point selected for at least one of the second color components is different from the grid points selected for at least one other of the second color components.

40. Computer-executable process steps according to claim 39, wherein in said selection step, only a pair of grid points is selected for each component of the second color components, each pair of grid points for one component being different from pairs of grid points for all other components.

41. An apparatus for generating values for second color data for each of plural second color components from first color data representing a target color, said apparatus comprising:

input means for inputting first color data representing a target color;

a memory for storing executable process steps; and a processor for executing the process steps stored in said memory so as to (1) select plural discrete grid points corresponding to each component of the second color components, based on a respective kind of each component of the second color components, and based on the first color data for the target color, and (2) for each component of the second color components, interpolate the corresponding plural grid points so as to obtain the second color data, wherein a common grid point is used and at least one grid point selected for at least one of the second color components is different from the grid points selected for at least one other of the second color components.

42. An apparatus according to claim 41, wherein the common grid point is common to each of the second color components.

43. An apparatus according to claim 42, wherein the common grid point is in the same general direction to the target color no matter where the target color is located.

44. An apparatus according to claim 42, wherein the common grid point lies along a neutral gray axis when a space formed by the grid points for all the second color components includes the neutral gray axis.

45. An apparatus according to claim 41, wherein the plural discrete grid points are selected from a look-up table in which when a grid point corresponding to first color data for a particular target color is looked up, second color data corresponding to the particular color are obtained.

46. An apparatus according to claim 41, wherein a grid includes all the grid points for all of the second color components, and wherein the grid includes one dimension for each color component of the first data.

47. An apparatus according to claim 46, wherein each dimension of the grid includes at least 16 grid points.

48. An apparatus according to claim 41, wherein for each component of the second color components interpolation is performed in only a single dimension.

49. An apparatus according to claim 48, wherein the interpolation for each component of the second color components is performed in a different dimension.

50. An apparatus according to claim 41, wherein the first color data has been obtained by performing undercolor removal.

51. An apparatus according to claim 41, wherein said processor selects only a pair of grid points for each component of the second color components, each pair of grid points for one component being different from pairs of grid points for all other components.

52. An apparatus for generating values for second color data for each of plural second color components from first color data representing a target color, said apparatus comprising:

input means for inputting first color data representing a target color;

a memory for storing executable process steps; and a processor for executing the process steps stored in said memory so as to (1) select plural discrete grid points for each component of the second color components based on the first color data for the target color, and (2) interpolate the plural grid points for each of the second color components so as to obtain the second color data, wherein a common grid point is used and at least one grid point selected for at least one of the second color components is different than the grid points selected for at least one other of the second color components.

53. An apparatus according to claim 52, wherein the common grid point is common to each of the second color components.

54. An apparatus according to claim 53, wherein the common grid point is in the same general direction to the target color no matter where the target color is located.

55. An apparatus according to claim 53, wherein the common grid point lies along a neutral gray axis when a space formed by the grid points for all the second color components includes the neutral gray axis.

56. An apparatus according to claim 52, wherein the plural discrete grid points are selected from a look-up table in which when a grid point corresponding to first color data for a particular target color is looked up, second color data corresponding to the particular color are obtained.

57. An apparatus according to claim 52, wherein a grid includes all the grid points for all of the second color components, and wherein the grid includes one dimension for each color component of the first data.

58. An apparatus according to claim 57, wherein each dimension of the grid includes at least 16 grid points.

59. An apparatus according to claim 52, wherein for each component of the second color components interpolation is performed in only a single dimension.

60. An apparatus according to claim 59, wherein the interpolation for each component of the second color components is performed in a different dimension.

61. An apparatus according to claim 52, wherein the first color data has been obtained by performing undercolor removal.

62. An apparatus according to claim 52, wherein said processor selects only a pair of grid points for each component of the second color components, each pair of grid points for one component being different from pairs of grid points for all other components.

* * * * *